(12) United States Patent
Miller

(10) Patent No.: US 9,535,998 B2
(45) Date of Patent: *Jan. 3, 2017

(54) INFORMATION REPOSITORY SEARCH SYSTEM

(71) Applicant: PayPal, Inc., San Jose, CA (US)

(72) Inventor: Craig Miller, Toronto (CA)

(73) Assignee: PAYPAL, INC., San Jose, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/223,858

(22) Filed: Mar. 24, 2014

(65) Prior Publication Data

US 2014/0207767 A1 Jul. 24, 2014

Related U.S. Application Data

(63) Continuation of application No. 13/604,366, filed on Sep. 5, 2012, now Pat. No. 8,712,996, which is a continuation of application No. 13/223,051, filed on Aug. 31, 2011, now Pat. No. 8,290,932, which is a continuation of application No. 12/055,874, filed on Mar. 26, 2008, now Pat. No. 8,032,515.

(51) Int. Cl.
*G06F 17/30* (2006.01)

(52) U.S. Cl.
CPC ..... *G06F 17/30864* (2013.01); *G06F 17/3087* (2013.01); *G06F 17/30873* (2013.01)

(58) Field of Classification Search
USPC ....................................................... 707/713
See application file for complete search history.

(56) References Cited

U.S. PATENT DOCUMENTS

| | | | | |
|---|---|---|---|---|
| 5,862,223 | A * | 1/1999 | Walker | G06Q 10/063112 705/50 |
| 6,738,759 | B1 * | 5/2004 | Wheeler | G06F 17/30607 707/741 |
| 6,795,819 | B2 * | 9/2004 | Wheeler | G06F 17/30289 707/691 |
| 7,155,451 | B1 | 12/2006 | Torres | |
| 7,255,451 | B2 * | 8/2007 | McCabe | B60R 1/088 359/265 |
| 7,593,928 | B2 * | 9/2009 | Canon | G06F 17/30905 |
| 8,032,515 | B2 * | 10/2011 | Miller | G06F 17/3087 707/713 |
| 8,290,932 | B2 | 10/2012 | Miller | |
| 8,712,996 | B2 | 4/2014 | Miller | |
| 2001/0044800 | A1 * | 11/2001 | Han | G06F 17/30864 |
| 2003/0200192 | A1 * | 10/2003 | Bell | G06F 17/3087 |

(Continued)

OTHER PUBLICATIONS

"U.S. Appl. No. 12/055,874, Advisory Action mailed Dec. 30, 2010", 2 pgs.

(Continued)

*Primary Examiner* — Cam-Linh Nguyen
(74) *Attorney, Agent, or Firm* — Maschoff Brennan

(57) ABSTRACT

Systems and methods for an information repository search system are disclosed. The system receives search criteria from users and associates the search criteria with source information. The source information identifies sources via which the search criteria are being received. The system further maintains counts of instances for the plurality of search criteria in association with the respective source information.

14 Claims, 10 Drawing Sheets

(56) References Cited

U.S. PATENT DOCUMENTS

| | | | |
|---|---|---|---|
| 2005/0222987 A1* | 10/2005 | Vadon | G06F 17/30997 |
| 2006/0105781 A1* | 5/2006 | Ueda | G01C 21/28 455/456.1 |
| 2006/0143160 A1* | 6/2006 | Vayssiere | G06F 17/30864 |
| 2008/0005086 A1* | 1/2008 | Moore | G06F 17/30876 |
| 2009/0049051 A1 | 2/2009 | Horowitz et al. | |
| 2009/0132512 A1* | 5/2009 | Kislyuk | G06F 17/3087 |
| 2009/0171929 A1* | 7/2009 | Jing | G06F 17/3064 |
| 2009/0248626 A1* | 10/2009 | Miller | G06F 17/3087 |
| 2009/0265251 A1* | 10/2009 | Dunlap | G06Q 10/087 705/26.1 |
| 2011/0313998 A1* | 12/2011 | Miller | G06F 17/3087 707/713 |
| 2012/0330942 A1 | 12/2012 | Miller | |

OTHER PUBLICATIONS

"U.S. Appl. No. 12/055,874, Final Office Action mailed Oct. 13, 2010", 8 pgs.

"U.S. Appl. No. 12/055,874, Non Final Office Action mailed Feb. 10, 2011", 9 pgs.

"U.S. Appl. No. 12/055,874, Non-Final Office Action mailed Jun. 15, 2010", 9 pgs.

"U.S. Appl. No. 12/055,874, Notice of Allowance mailed Jun. 1, 2011", 7 pgs.

"U.S. Appl. No. 12/055,874, Response filed Dec. 13, 2010 to Final Office Action mailed Oct. 13, 2010", 13 pgs.

"U.S. Appl. No. 12/055,874, Response filed May 10, 2011 to Non Final Office Action mailed Feb. 10, 2011", 16 pgs.

"U.S. Appl. No. 12/055,874, Response filed Sep. 14, 2010 to Non Final Office Action mailed Jun. 15, 2010", 13 pgs.

"U.S. Appl. No. 13/223,051, Non Final Office Action mailed Jan. 26, 2012", 6 pgs.

"U.S. Appl. No. 13/223,051, Notice of Allowance mailed Jun. 5, 2012", 7 pgs.

"U.S. Appl. No. 13/223,051, Response filed Apr. 26, 2012 to Non Final Office Action mailed Jan. 26, 2012", 12 pgs.

"U.S. Appl. No. 13/604,366, Final Office Action mailed Aug. 22, 2013", 9 pgs.

"U.S. Appl. No. 13/604,366, Non Final Office Action mailed Apr. 9, 2013", 10 pgs.

"U.S. Appl. No. 13/604,366, Notice of Allowance mailed Dec. 4, 2013", 9 pgs.

"U.S. Appl. No. 13/604,366, Response filed Nov. 22, 2013 to Final Office Action mailed Aug. 22, 2013", 14 pgs.

"U.S. Appl. No. 13/223,051, Response to Rule 312 mailed Sep. 14, 2012", 2 pgs.

\* cited by examiner

INFORMATION REPOSITORY SEARCH SYSTEM

RELATED APPLICATIONS

This application is a continuation of U.S. application Ser. No. 13/604,366, filed Sep. 5, 2012, which is a continuation of U.S. application Ser. No. 13/233,051, filed Aug. 31, 2011 which is a continuation of U.S. application Ser. No. 12/055,874, filed Mar. 26, 2008, both of which are incorporated herein by reference in their entirety.

TECHNICAL FIELD

Example embodiments relate generally to the technical field of data management, and in one specific example, to a system and a method for generating popular searches in an information repository.

BACKGROUND

More and more, Internet users are realizing the ease and convenience of searching online for information on a variety of subjects. For example, users may search information related to one or more items or services of interest, destination locations, driving directions, books in a library, or financial information such as mortgage interest rates and prices of securities in a financial market.

On the other hand, content providers such as corporate web designers or hobbyists may struggle to make their contents more and more accessible to searching users. Content providers, may compete in increasing their ranks in search results generated by search engines, such as GOOGLE, YAHOO, ALTA VISTA, etc., through providing contents that would address needs of a larger population of searching users.

BRIEF DESCRIPTION OF THE DRAWINGS

Some embodiments are illustrated by way of example and not limitation in the figures of the accompanying drawings in which.

DETAILED DESCRIPTION

Example methods and systems for compiling and presenting popular searches in an information repository will be described. In the following description, for purposes of explanation, numerous specific details are set forth in order to provide a thorough understanding of example embodiments. However, it will be evident to one skilled in the art that the present invention may be practiced without these specific details.

Some example embodiments described herein may include receiving one or more search criteria from a number of users, respectively. The one or more search criteria may be applied to a common information repository. Source and category information may be associated with each of the search criteria. The category information may identify a category of a number of categories into which information in the common information repository may be categorized. The source information may identify a source of a number of sources via which the one or more search criteria are receivable. Each of the search criteria may be stored in association with the source and the category information.

In an example embodiment, receiving a search criterion may comprise receiving a search query from a user of an online publication system (e.g., KIJIJI.COM, a subsidiary of EBAY INC., of San Jose, Calif.). The search query may include keywords and logical constructs as is well known in the field of data retrieval.

Figure 1:
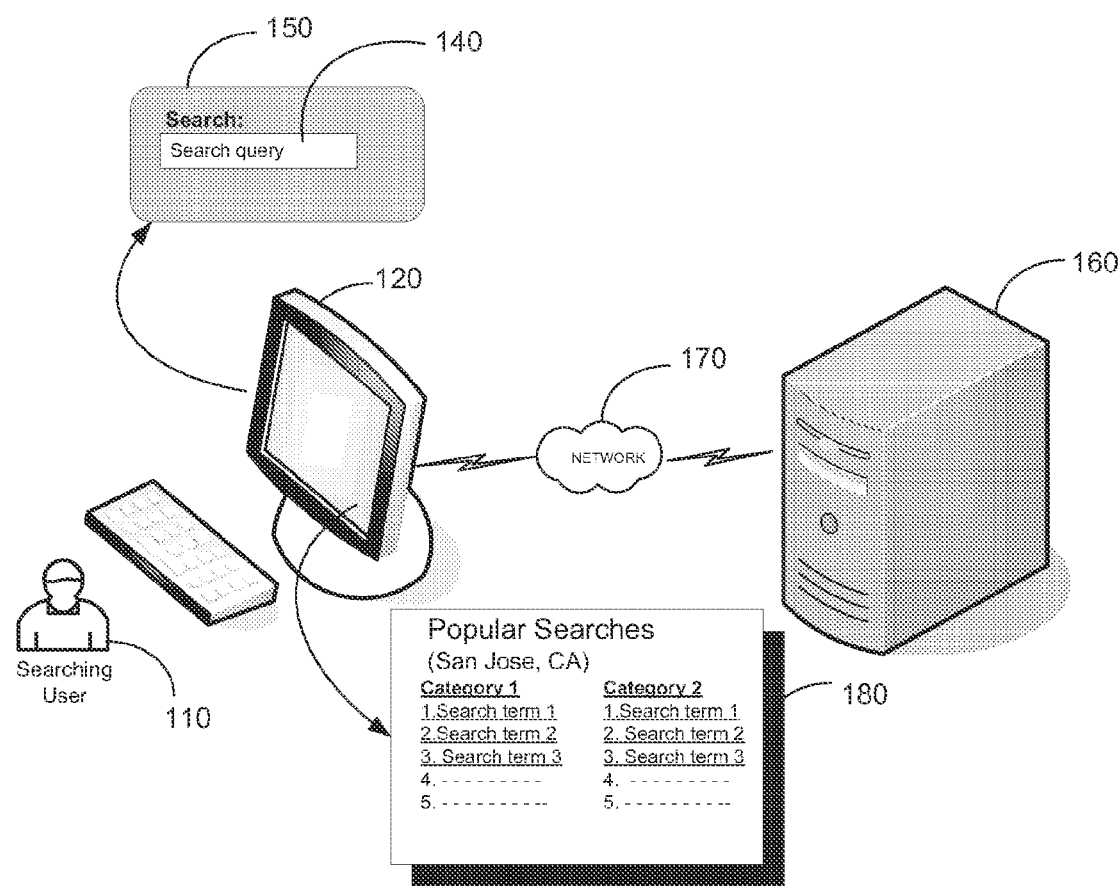
FIG. 1 is a high-level diagram depicting, in an example embodiment, functionality of a system for compiling and presenting popular searches in an information repository search system.

FIG. 1 is a high-level diagram depicting, in an example embodiment, functionality of a system for compiling and presenting popular searches in an information repository. One or more searching users 110 (of multiple users) may use one or more user machines 120 (e.g., personal computers, Personal Digital Assistants (PDA), cell phones, etc.) to access one or more of information sources in the form of a number of websites hosted by a server 160 (or servers) of a publication system. Each of the websites may be focused on a specific demographic of user. For example, each of the websites may be directed and customized to a specific geographic region (e.g., city, state or country) The one or more searching users 110 may use a user interface 150 provided by a website to enter one or more search queries 140 against a common information repository to search for information (e.g., a publication such as a listing of a product, a service, an online content, etc.) in the publication system. The server 160 of the publication system may be linked to the one or more user machines 120 via a network 170, e.g., the Internet.

The server 160 may receive multiple search criteria as part of the one or more search queries 140. For each of the search criteria received, the server 160 may also associate geographic information (e.g., a geographic location such as a country or a city in which a listing is sought for or the user machine 120 is located) and category information (e.g., a category to which a searched listing may be related). The server 160 may store each of the search criteria in association with the source and category information. The source information may identify a source among a number of sources, via which one or more search criteria may be received. The category information may identify a category among a number of categories, into which information in the common information repository may be categorized.

In example embodiments, the source information may include a number of websites, via which the multiple search criteria may be received. Each of the websites may be customized to a specific user demographic. The specific user demographic may include at least one of a geographic, language, cultural or interest demographic. For example, one of the web sites may be specific to a particular country e.g., Canada, a particular region, e.g., KIJIJI Bay Area, or a particular language (e.g., English, French, German, etc.).

According to an example embodiment, the searching user 110 may visit KIJIJI United States Web site and select a city e.g., Sacramento, Calif. The searching user 110 may then select a category, e.g., "Cars over $5K," under a high level category "cars & vehicles" and enter a search term e.g. "Honda Accord Ex." The server 160 may associate the search term "Honda Accord Ex" with the city of Sacramento and the category "cars & vehicles."

In an example embodiment, the server 160 may maintain a count of instances of a first search criteria, e.g., "Honda Accord Ex," for each of the one or more unique geographic and category information combinations, e.g., "Sacramento—Cars—over $5 k" combination. The count of instances may be maintained over a determinable time interval which may be modified based on a rate at which instances of search criteria are received. For example, if the number of search queries searching "Honda Accord Ex" in Sacramento is less than 5, in a period of 2 days, the server 160 may extend the time interval for another 2 days in order to receive at least 5 search queries.

According to example embodiments, the server 160 may generate a set of search criteria from the one or more search criteria received form the searching users 110, based on matching associated geographic and category information. An example set may include all search criteria under the category "cars—over $5 k" for the geographic information "Sacramento." Such a set may include, for example, Honda Accord Ex (10), Toyota Camry (34), Nissan (13), where the numbers in parentheses may represent the number of instances for each search criteria.

The server 160 may rank the set of search criteria based on the count of instances of each search criteria to generate a ranked set of search criteria. The ranked set in the above example may include Toyota Camry (34), Nissan (13), and Honda Accord Ex (10). The server 160 may present the ranked set of criteria to the searching users 110 as shown in an example user interface 180.

According to an example embodiment, the search query 140 may include a source identifier (e.g., a geographic identifier, such as a city, for example, Sacramento, selected by searching user 110 of KIJIJI) and a category identifier (e.g., a category such as "Cars—over $5 k" selected by the searching user 110 when using KIJIJI), and the association of the geographic information and the category information with a search criteria of the search query may be performed using the geographic identifier and the category identifier. In this case, for example, the search term "Honda Accord Ex" may be associated with "Sacramento," as the geographic information and "cars—over $5 k" as the category information. In an example embodiment, the geographic identifier may be stored in cookies on the user machines 120. The geographic identifier stored in the cookies may be the identity of the geographic locations the user machines 120 (e.g., a city name collected by an Internet Service Provider (ISP) and stored in the cookie).

In example embodiments, the server 160 may recommend one or more search criteria to the searching users 110. The recommendation may be based on the source information and the category information. For example, the recommended search criteria to the searching users 110 searching KIJIJI in San Jose, Calif. may be a popular search criterion associated with San Jose. In case the searching user 110 selects a category such as "Jobs," the server 160 may recommend to the user a popular job title in San Jose, e.g., "engineer" as a search criterion. The server 160 may receive further geographic and category information from the searching users 110 (e.g., a city name specified in or a category inferred from a search term such as "Honda Accord Ex San Jose," where the city is specified and the category "cars" may be inferred). The server 160 may match further geographic and category information with the geographic and category information, and recommend one or more search criteria based on the matching.

Figure 2:
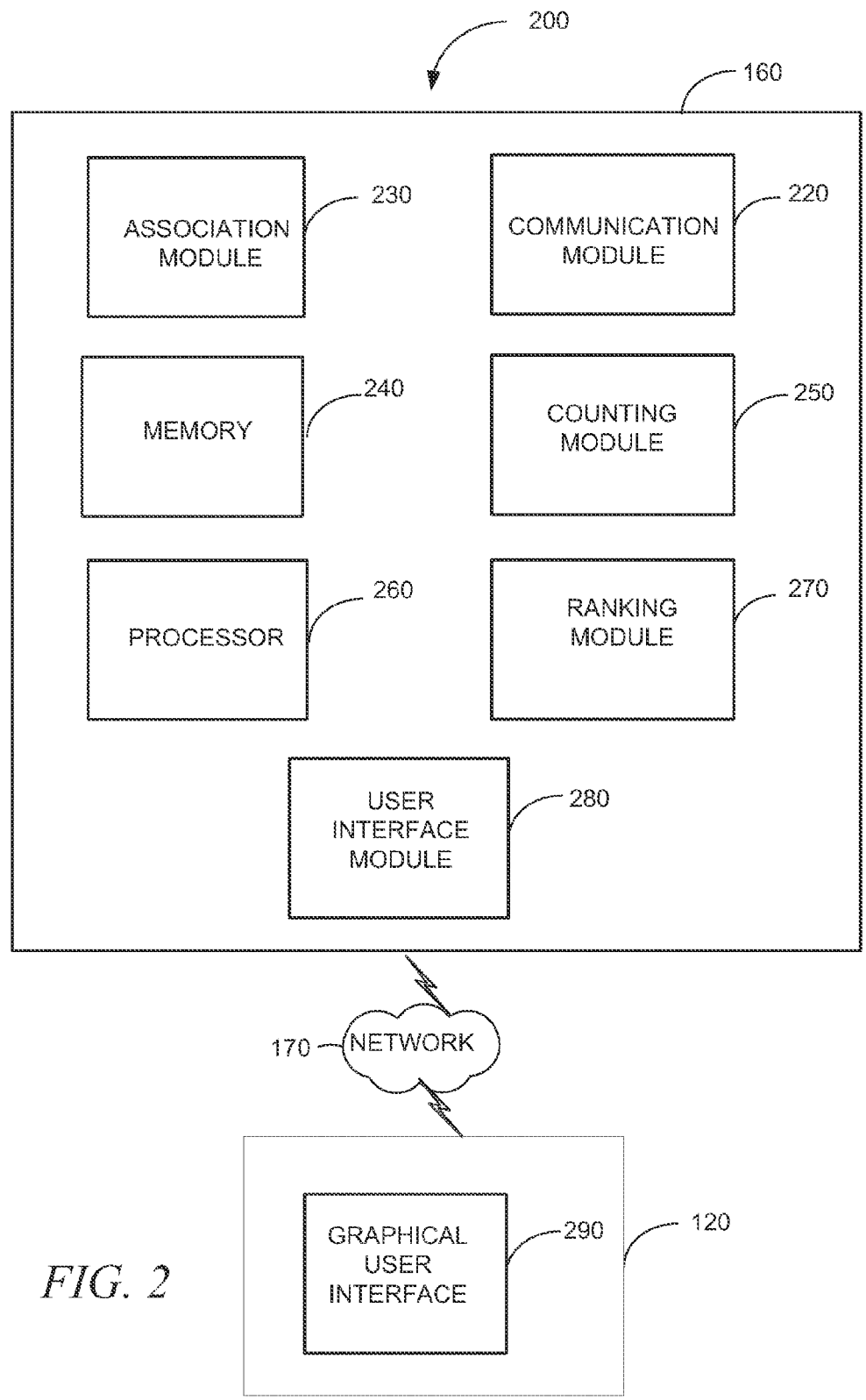
FIG. 2 is a block diagram illustrating an example embodiment of a system for generating and presenting popular searches in an information repository search system.

FIG. 2 is a block diagram illustrating an example embodiment of a system 200 for generating and presenting popular searches in an information repository search system. The system 200 may include the server 160 and one or more user machines 120 linked via a network 170, e.g., the Internet. The server 160 may include multiple hardware and software modules such as an association module 230, a communication module 220, a memory 240, a counting module 250, a processor 260, a ranking module 270, and a user interface module 280. The user machine 120 may include a graphical user interface 290.

Figure 3:
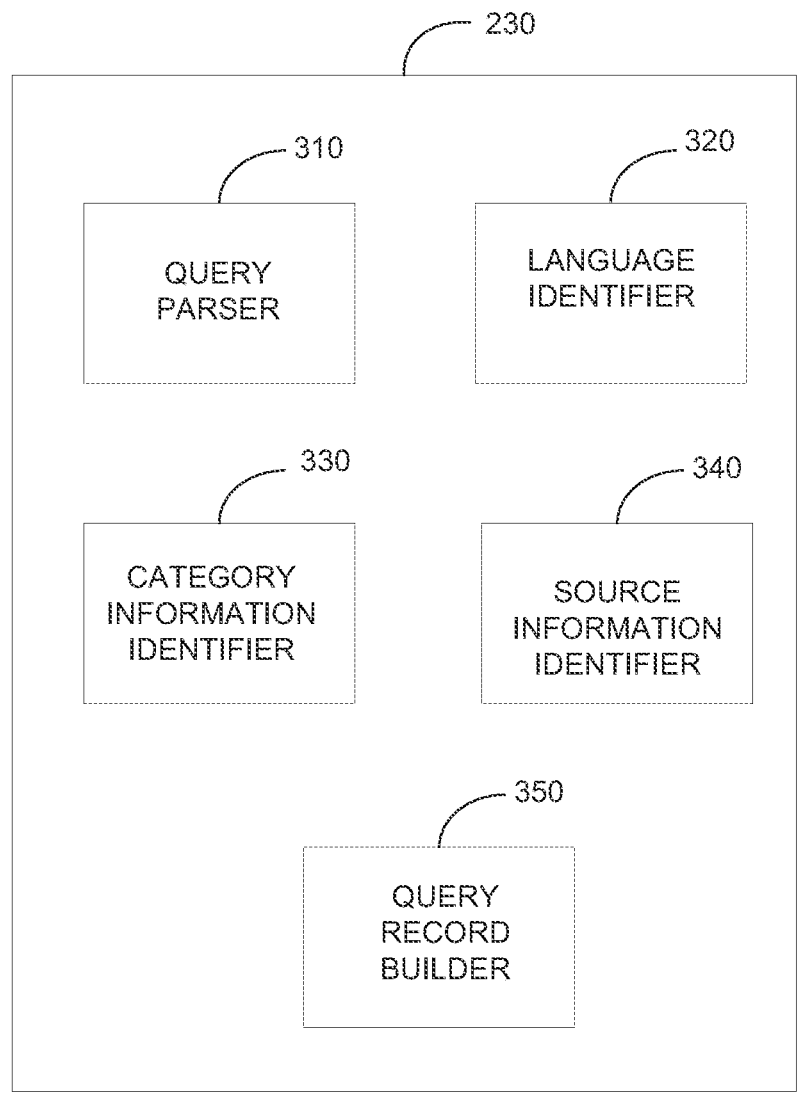
FIG. 3 is a block diagram illustrating, in an example embodiment, components of an association module used in FIG. 2.

According to example embodiments, the communication module 220 may receive one or more search queries 140 including one or more search criteria from one or more searching users 110. The received search criteria may include source and category identifiers. The association module 230 may associate source information and category information with each of the one or more search criteria. The association module 230 may include components shown in FIG. 3, such as a query parser 310, a language identifier 320, a category information identifier 330, a source information identifier 340, and a query record builder 350.

The query parser 310 may parse a query 140 entered by a searching user 110, for example, by breaking down the search query into its component parts and identifying the component parts. The language identifier 320 may identify a language information associated with each of the one or more search criteria (e.g., English, German, and the like). The language identifier 320 may, for example, compare the words of the search query against lists of words associated with one or more languages. The language identifier 320 may use more sophisticated algorithms to identify the language associated with each search query. The query record builder 350 may indicate the language associated with the search query 140 using a language identification (ID) field 720 of a search query record 700 (see FIG. 7) of a database stored in the memory 240.

In example embodiments, the category information identifier 330 may use the parsed components of the search query 140 to identify a category information. For example, when the query 140 includes the word "Honda Accord," the category information identifier 330 may identify the category as being "cars & vehicles." The category information identifier 330 may also identify the category based on a category identifier. The category identifier may be detected, when the searching user 110 enters a publication system, e.g., KIJIJI, and selects a category before entering the search query 140. The selected category may be detected as the category identifier by the association module 230. The query record builder 350 may include the category information in a category ID field 750 of a database record for the search query (see FIG. 7) stored in the memory 240.

According to example embodiments, the source information identifier 340 may utilize the parsed components of the search query 140 to identify source information, e.g., geographic information. For example, when the search query 140 includes the word "San Jose," the source information identifier 340 may identify the geographic information as being the city of San Jose. The source information identifier 340 may also identify the source information based on a source information identifier 340. The source information identifier 340 may be detected, when the searching user enters a source, e.g., a geographic location name such as a city name before entering the search query in a user interface 150.

In another example embodiment, the searching user 110 may enter a Web page associated with a specific city, e.g., TORONTOKIJIJI.COM. In this case, all search queries entered into the Web page may be automatically tagged with Toronto as the geographic identifier. The source information identified by the source information identifier 340 may be used by the query record builder 350 to fill in, for example, a country field 730 and a city field 740 of the search query record shown in FIG. 7.

Returning to FIG. 2, the counting module 250, in an example embodiment, may maintain a count of instances of a first search criterion, e.g., "Honda Accord Ex," received from one or more searching users 110, for each of the one or more unique geographic and category information combinations, e.g., "Sacramento—cars—over $5 k" combination. The counting module 250 may maintain the count of instances over a determinable time interval. The determinable time interval may be modified based on a rate at which instances of search criteria are received.

The processor 260 may generate a set of search criteria from the one or more search criteria include in the search queries 140, based on matching associated source and category information, for each of the plurality of unique source and category information combinations. An example set may include all search criteria under the category "Cars—over $5 k" for the geographic information "Sacramento." Such a set may include, for example, Honda Accord Ex (10), Toyota Camry (34), Nissan (13), where the numbers in parentheses may represent the number of instances for each search criteria.

In example embodiments, the ranking module 270 may rank the set of search criteria based on a count of instances of each search criterion, e.g., "Honda Accord Ex." The ranked set in the above example may include Toyota Camry (34), Nissan (13), and Honda Accord Ex (10). The user interface module 280 may present the ranked set of criteria to the searching user 110 as shown in an example user interface 180.

The graphical user interface 290, in an example embodiment, may include the user interfaces 150 and 180 of FIG. 1 used to receive the search queries 140 from the searching users 110 and to present the popular searches, e.g., the ranked sets of criteria, for a geographic location, under various categories, to the searching users 110.

Figure 4:
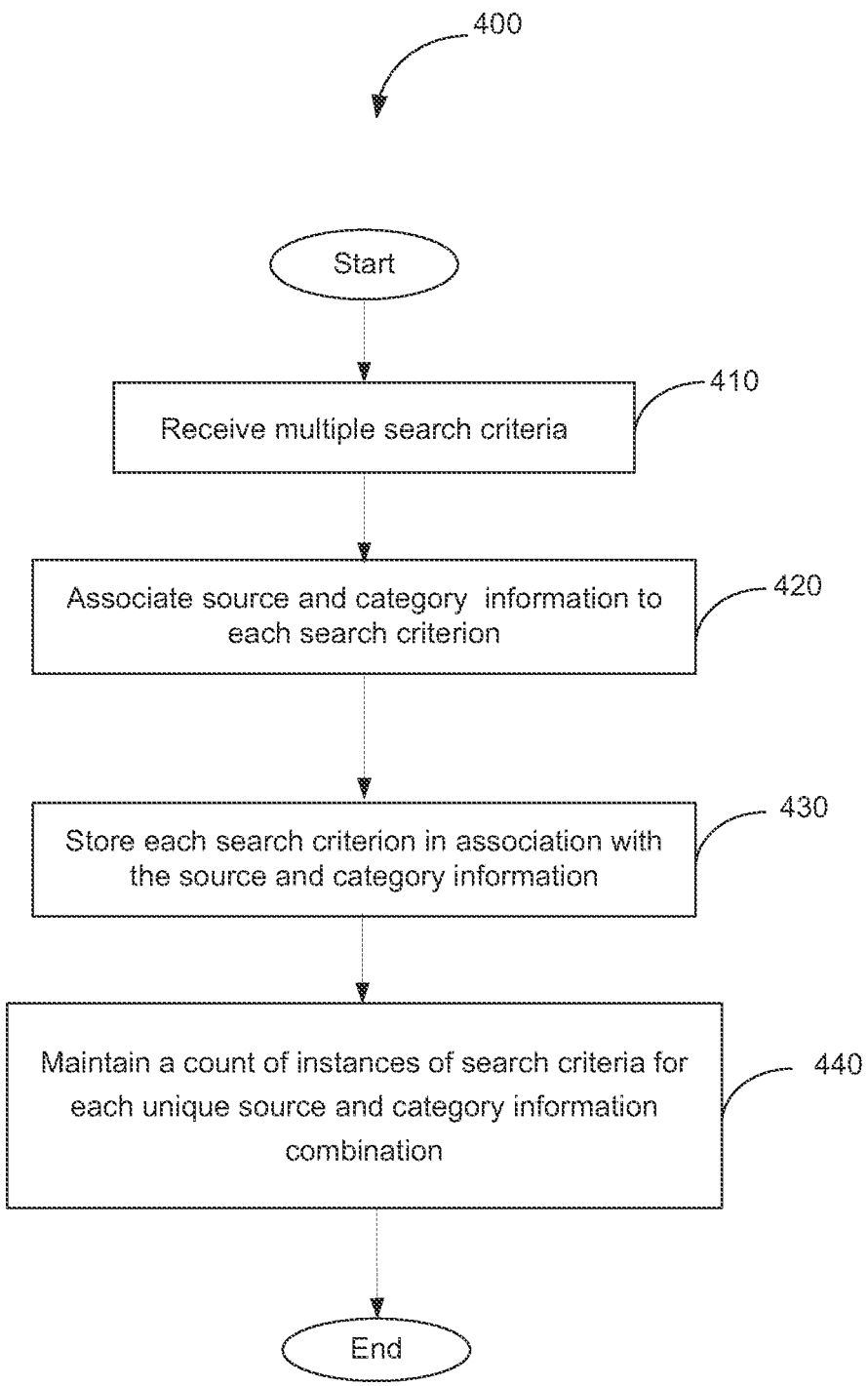
FIG. 4 is a high-level flow diagram illustrating an example method for compiling popular searches in an information repository search system.

FIG. 4 is a high-level flow diagram illustrating an example method 400 for compiling popular searches. The method starts at operation 410, where the communication module 220 may receive one or more search criteria, as parts of the search queries 140, from one or more searching users 110 of an information repository. At operation 420, the association module 230 may associate source information (e.g., geographic or language information) and category information to each of the search queries 140. The memory 240, at operation 430, may store each search criteria in association with the geographic (e.g., a city name, a country name) category (e.g., Jobs, Services, Cars, etc.) and language information. For example, if the search query is entered in TORONTOKIJIJI, for example, under category "jobs", the association module 230 may associate Toronto, "Jobs", and English as the geographic, category and language information, respectively, with the search query.

In an example embodiment, the counting module 250 may maintain a count of instances of search criteria, e.g., "Honda Accord Ex", for each unique language, geographic and category information combination. For example, the counts associated with instances of "Honda Accord Ex" in an English language Web site, e.g. TORONTOKIJIJI.com, entered after selecting the category "cars—over $5K," may be uniquely maintained by counting the number of records associated with such a unique information combination. A stored record (see FIG. 7) for the above query may indicate English, Canada, Toronto, and "cars—over $5K", respectively, in language ID field 720, country field 730, city field 740, and category ID field 750.

Figure 5:
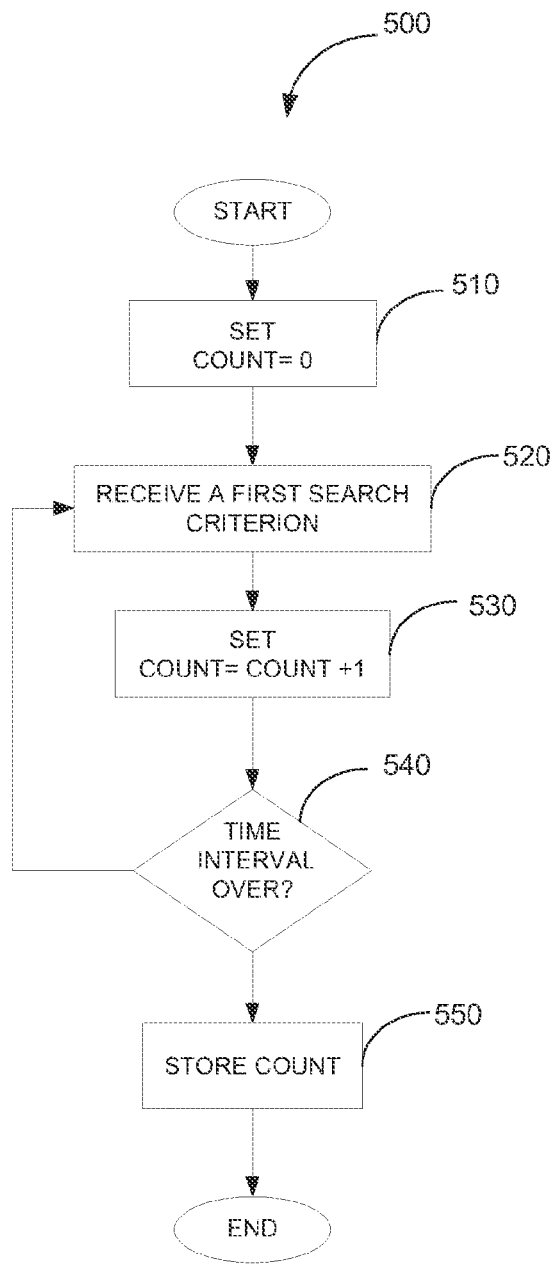
FIG. 5 is a flow diagram illustrating an example method for compiling a list of popular searches in an information repository search system.

FIG. 5 is a flow diagram illustrating an example method 500 for compiling a list of popular searches into an information repository. The counting module 250, at operation 510, may initialize a count parameter to zero. At operation 520, the communication module 220 may receive a first search criterion e.g., "Honda Accord Ex." in response, the counting module 250 may increment the count parameter to indicate the first instance of the first search criterion (operation 530).

At control operation 540, if a determinable time interval is not over, the control is passed to the operation 520, where further instances of receiving the first search criteria are counted. However, If the determinable time interval is over, at operation 550, the value of the count parameter, as an indication of the number of instances of the first search query is stored in the memory 240. The determinable time interval may be dependent on the rate at which instances of the first search query are received.

Figure 6:
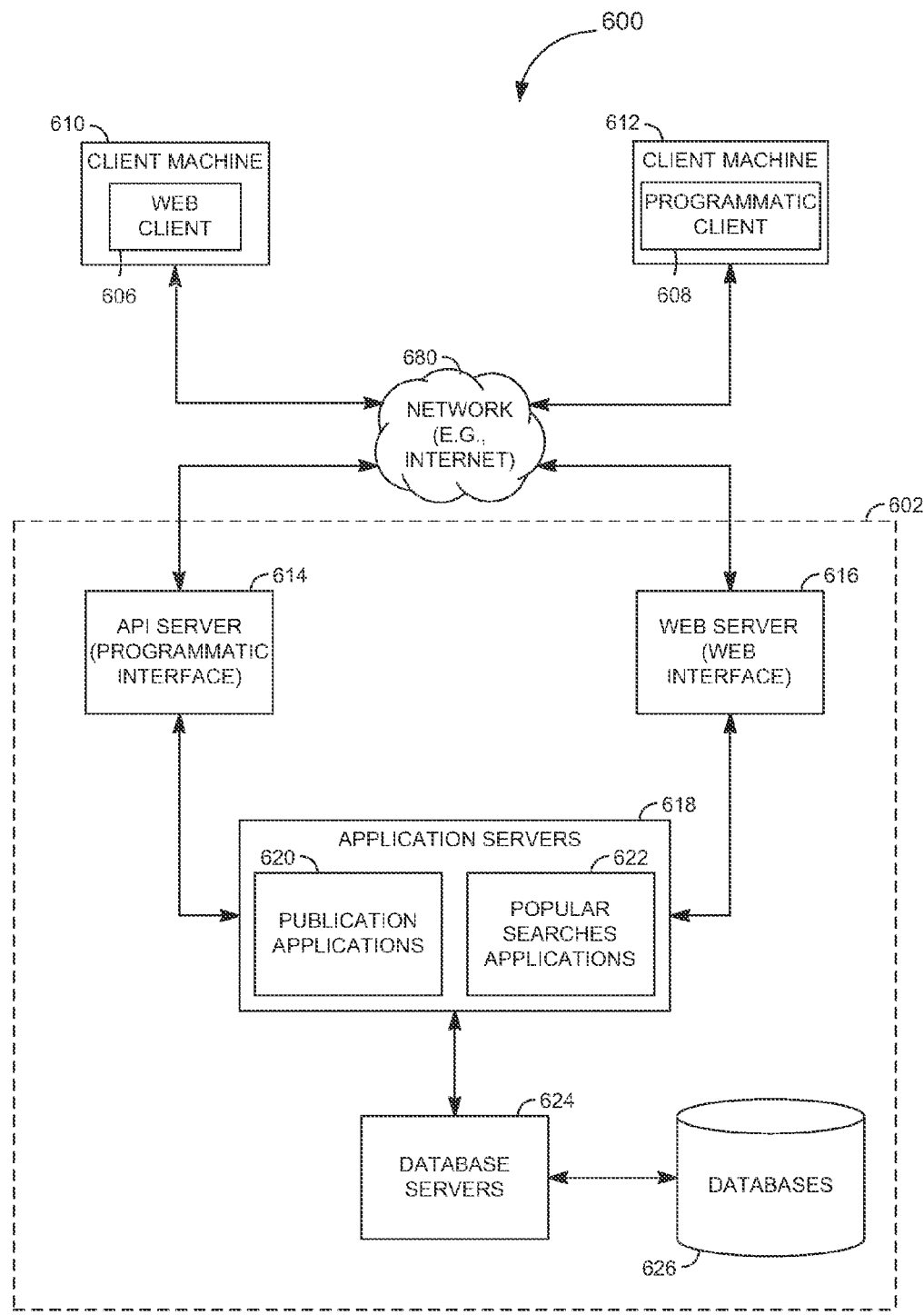
FIG. 6 is high-level block diagram illustrating an example embodiment of a network-based publication system enabled to compile popular searches, having a client-server architecture.

FIG. 6 is high level block diagram illustrating an example embodiment of a network-based publication system 600 enabled for compiling popular searches. A publication platform, in the example form of a popular searches compilation server 602, may provide server-side functionality, via a network 680 (e.g., the Internet) to one or more clients. FIG. 6 illustrates, for example, a Web client 606 (e.g., a browser, such as the INTERNET EXPLORER browser developed by Microsoft Corporation of Redmond, Wash.), and a programmatic client 608 executing on respective client machines 610 and 612.

Turning specifically to the popular searches compilation server 602, an Application Program interface (API) server 614 and a Web server 616 are coupled to, and provide programmatic and Web interfaces respectively to, one or more application servers 618. The application servers 618 host one or more publication applications 620 and popular searches applications 622. The application servers 618 are, in turn, shown to be coupled to one or more database servers 624 that facilitate access to one or more databases 626.

The publication applications 620 may provide a number of publication functions and services to users who access the network-based publication system 600. For example, the publication applications may support posting and browsing listings (e.g., items, services, etc.) in the network-based publication system 600. The popular searches applications 622 may compile and present to users one or more lists of popular searches for a geographic location (e.g., as a country, a region, or a city) under one or more categories in one or more languages.

Further, while the network-based publication system 600 shown in FIG. 6 employs a client-server architecture, the disclosed system is not limited to such an architecture and could equally well find application in a distributed, or peer-to-peer, architecture system. The various publication and popular searches applications 620 and 622 could also be implemented as stand-alone software programs, which do not necessarily have networking capabilities.

The Web client 606 may access the publication and popular searches applications 620 and 622 via the Web interface supported by the Web server 616. Similarly, the programmatic client 608 may access the various services and functions provided by the publication and popular searches applications 620 and 622 via the programmatic interface provided by the API server 614. The programmatic client 608 may, for example, be a search application to enable buyers to search for listings of interest to the buyers in the network-based publication system 600. In another example embodiment, the programmatic client 608 may support sellers by facilitating posting of one or more items on the network-based publication system 600.

Figure 7:
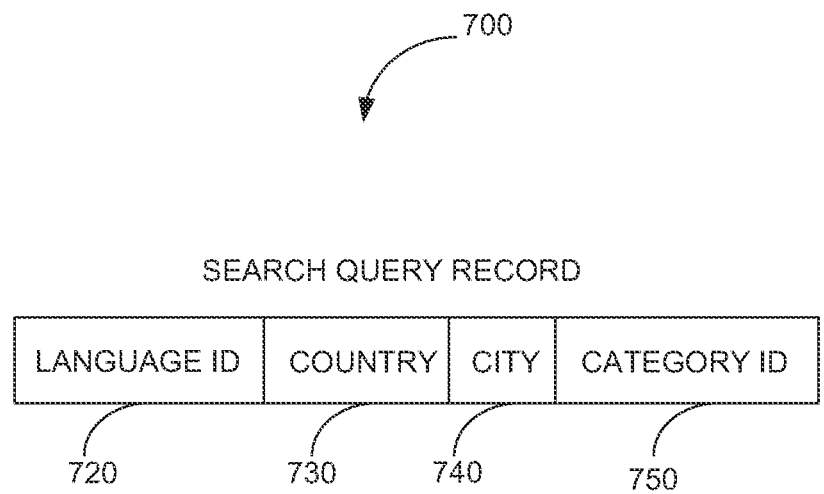
FIG. 7 is diagram illustrating, in an example embodiment, structure of a search query record.

FIG. 7 is diagram illustrating, in an example embodiment, structure of a search query record. The example search query record stored in memory 240 may include fields such as language ID field 720, country field 730, city field 740, and category ID field 750. The language ID filed 750 may contain a language identifier associated with the search query 140. The language identifier may include a unique code for each language (e.g., 01 for English, 02 for German, etc.) or an abbreviation (e.g., ENG, GER, etc.) identifying the language of the search query 140.

The country and city fields 730 and 740 may contain the geographic information associated with the search query 140 (e.g., name of the country and the city in which a searched listing such as an item or a service is searched for, or the name of the country and the city associated with a web site form which the search query is entered). The category ID 750 may include an identifier of the category associated with the search query. The category ID 750 may be a number or a set of characters uniquely identifying a category associated with the search query.

Figure 8:
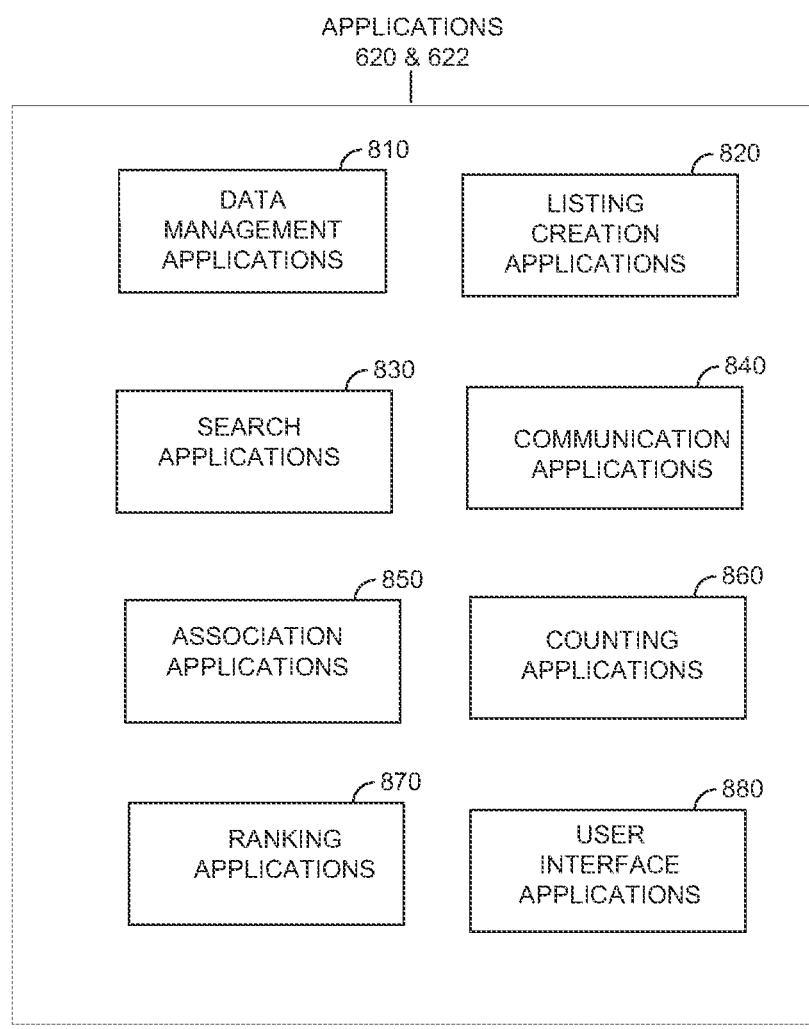
FIG. 8 is an example set of publication and popular searches applications used by the network-based publication system of FIG. 6.

FIG. 8 is an example set of publication and popular searches applications used by the network-based publication system of FIG. 6. The popular searches compilation server 602 may provide a number of the publication applications 620 and the popular searches applications 622, whereby a user may post a listing or browse published listings in the network-based publication system 600, and the popular searches compilation server 602 may compile one or more lists of popular searches for a geographic location (e.g., as a country or a city) under one or more categories.

Various data management applications 810 may provide support for handling data, including storing and retrieving data related to various listings published in the network-based publication system 600. The data management applications 810 may facilitate for the listing data to be categorized according to specific categories based on certain keywords.

A number of listing creation applications 820 may allow sellers of items or posters of advertisements to conveniently author listings pertaining to goods or services that they wish to publish via the network-based publication system 600. The listing creation applications 820 may receive input data provided by the sellers or posters, and may have the data management applications 810 store the data in appropriate categories. The listing creation applications 820 may also provide listing information for the user interface applications 880 to display the listings to users.

A number of search applications 830 may support searching the databases 626 of the network-based publication system 600 for data items, using search criteria received from a user of the network-based publication system 600. Communication applications 840 may facilitate receiving search criteria from users of the network-based publication system 600. The communication applications 840 may also communicate user interface data including popular searches to the users.

One or more association applications 850 may associate source information (e.g., geographic, language, or cultural information, etc.) and category information with each of the search criteria received by the communication applications 840. Counting applications 860 may support maintaining the count of instances of each search criteria received, over a determinable time interval, from the users of the network-based publication system 600.

Ranking applications 870 may facilitate ranking of sets of search criteria formed based on matching associated source and category information. The ranking may be performed based on the counts of instances of each search criterion received from users of the network-based publication system 600.

The user interface applications 880 may display various pages (see, for example, FIG. 10) showing ranked popular searches, under various categories, to the users of the network-based publication system 600. The user interface applications 880 may also display pages whereby users may post advertisements for items or services in the network-based publication system 600.

Machine Architecture

Figure 9:
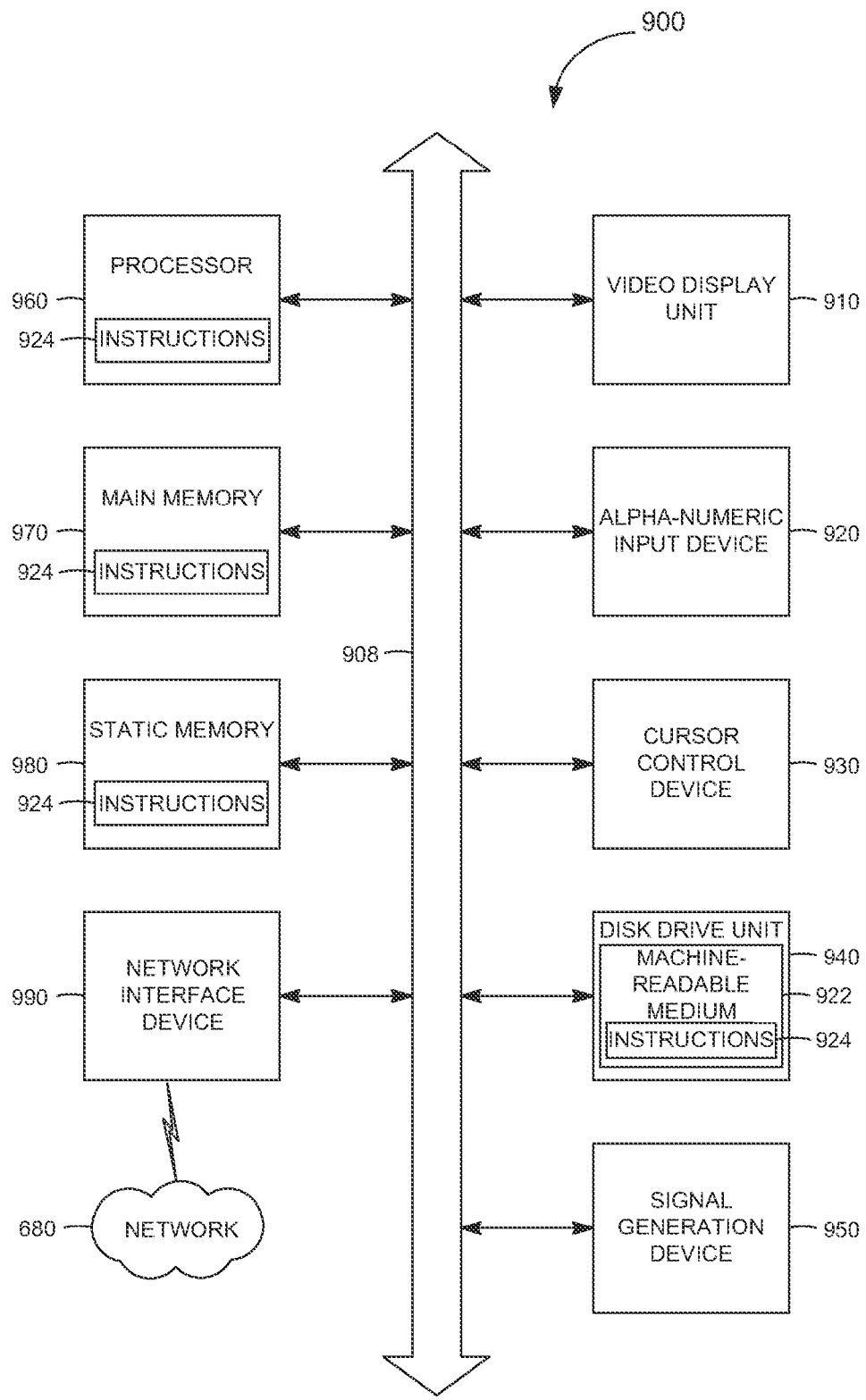
FIG. 9 is a diagram illustrating a diagrammatic representation of a machine in the example form of a computer system.

FIG. 9 is a diagram illustrating a diagrammatic representation of a machine 900 in the example form of a computer system, within which a set of instructions for causing the machine to perform any one or more of the methodologies discussed herein may be executed. In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment.

The machine 900 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 960 (e.g., a central processing unit (CPU), a graphics processing unit (GPU) or both), a main memory 970 and a static memory 980, all of which communicate with each other via a bus 908. The computer system 900 may further include a video display unit 910 (e.g., a liquid crystal display (LCD) or cathode ray tube (CRT)). The computer system 900 also may include an alphanumeric input device 920

(e.g., a keyboard), a cursor control device 930 (e.g., a mouse), a disk drive unit 940, a signal generation device 950 (e.g., a speaker) and a network interface device 990.

The disk drive unit 940 may include a machine-readable medium 922 on which is stored one or more sets of instructions (e.g., software 924) embodying any one or more of the methodologies or functions described herein. The software 924 may also reside, completely or at least partially, within the main memory 970 and/or within the processor 960 during execution thereof by the computer system 900, with the main memory 970 and the processor 960 also constituting machine-readable media.

The software 924 may further be transmitted or received over a network 680 via the network interface device 990.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

User Interfaces

Figure 10:
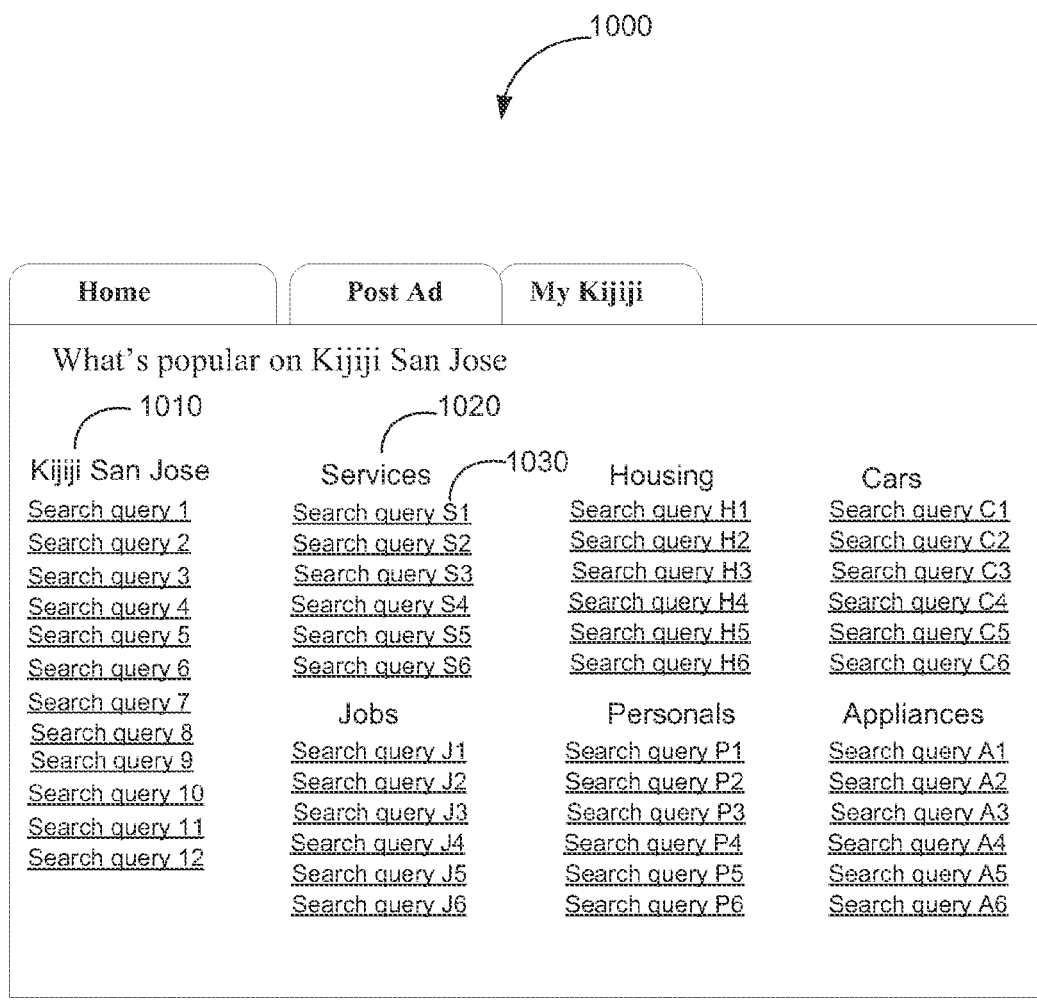
FIG. 10 is a screen shot illustrating an example embodiment of a Web page for presenting compiled popular searches in an information repository search system.

FIG. 10 is a screen shot illustrating an example embodiment of a Web page 1000 for presenting compiled popular searches in an information repository. All of the ranked popular search queries presented in this Web page may be related to San Jose, e.g., may relate to listings, such as items or services, available in San Jose or San Jose may be the name of the city from which users have initiated their searches. Column 1010 lists the top n, e.g., top 12, ranked search queries for the city of San Jose, regardless of categories. The rest of the columns may display ranked search queries under various categories (e.g., Services, Jobs, Housing, Personals, etc.). Column 1020, for example, lists the top six search queries under the category "Services." The search queries in column 1020, have been associated to the geographic location "San Jose," and category "Services" and the character "S" in the rank indicators 1030 (e.g., S1, S2, etc.) is used to distinguish search queries under various categories. For example, S1 suggests that the "search query S1" would belong to the category "Services" and would have the highest popularity among the search queries, in San Jose, under the category "Services".

Thus, a method and a system for compiling and presenting popular searches in an information repository have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

I claim:

1. A method comprising:

receiving a plurality of search criteria, over a network, from a plurality of client machines;

associating the plurality of search criteria with source information, the source information identifying a plurality of sources via which the plurality of search criteria are being received, the plurality of sources including a plurality of websites, the plurality of search criteria being received from the plurality of client machines via the plurality of websites;

associating the plurality of search criteria with category information, the category information including a plurality of categories into which information in an information repository is categorized, the information repository being stored in a networked database;

storing, in the information repository, a plurality of counts of instances for the plurality of search criteria in association with the respective source information and category information;

storing, for each of a plurality of unique source information and category information combinations, a count of instances for a first search criterion, the plurality of counts of instances for the plurality of search criteria including the count of instances for the first search criterion;

generating, for each of the plurality of unique source information and category information combinations, a ranked set of search criteria from the plurality of search criteria based on matching associated source information and category information; and transmitting, from a server over a network, instructions to cause a client machine to generate a user interface that is configured to display the ranked set of search criteria.

2. The method of claim 1, wherein each of the plurality of websites is associated with a user demographic.

3. The method of claim 2, wherein the user demographic is at least one of a geographic, language, cultural or interest demographic.

4. The method of claim 1, further comprising:

maintaining the count of the instances over a time interval; and modifying the time interval based on a rate at which instances of the first search criterion are being received.

5. The method of claim 1, wherein each search criterion of the plurality of search criteria is received as part of a search query and wherein the search query includes a source identifier and a category identifier.

6. The method of claim 5, wherein the plurality of search criteria includes a search criterion and wherein the associating the plurality of search criteria with category information includes associating the search criterion with category information based on the category identifier.

7. The method of claim 6, wherein the associating the plurality of search criteria with source information includes associating the search criterion with source information based on the source identifier.

8. A system comprising:
a networked database storing an information repository and one or more search query records;
one or more processors and executable instructions accessible on a computer-readable medium that, when executed, cause the processor to perform operations comprising:
receiving a plurality of search criteria, over a network, from a plurality of client machines;
associating the plurality of search criteria with source information, the source information identifying a plurality of sources via which the plurality of search criteria are received, the plurality of sources including a plurality of websites, the plurality of search criteria being received from the plurality of client machines via the plurality of websites;
associating the plurality of search criteria with category information, the category information including a plurality of categories into which information in an information repository is categorized, the information repository being stored in a networked database;
storing, in the information repository, a plurality of counts of instances for the plurality of search criteria in association with the respective source information and category information;
storing, for each of a plurality of unique source information and category information combinations, a count of instances for a first search criterion, the plurality of counts of instances for the plurality of search criteria including the count of instances for the first search criterion;
generating, for each of the plurality of unique source information and category information combinations, a ranked set of search criteria from the plurality of search criteria based on matching associated source information and category information; and
transmitting, from a server over a network, instructions to cause a client machine to generate a user interface that is configured to display the ranked set of search criteria.

9. The system of claim 8, wherein each of the plurality of websites is associated with a user demographic.

10. The system of claim 9, wherein the user demographic is at least one of a geographic, language, cultural or interest demographic.

11. The system of claim 8, wherein the operations further comprise:
maintaining the count of the instances over a time interval; and
modifying the time interval based on a rate at which instances of the first search criterion are received.

12. The system of claim 8, wherein each search criterion of the plurality of search criteria is received as part of a search query and wherein the search query includes a source identifier and a category identifier.

13. The system of claim 8, wherein the plurality of search criteria includes a search criterion and wherein the wherein the operations are further comprising associating the search criterion with category information based on the category identifier.

14. A non-transitory machine-readable storage medium having embodied thereon instructions executable by one or more processors of a machine that cause the machine to perform operations comprising:
receiving a plurality of search criteria, over a network, from a plurality of client machines;
associating the plurality of search criteria with source information, the source information identifying a plurality of sources via which the plurality of search criteria are being received, the plurality of sources including a plurality of websites, the plurality of search criteria being received from the plurality of client machines via the plurality of websites;
associating the plurality of search criteria with category information, the category information including a plurality of categories into which information in an information repository is categorized, the information repository being stored in a networked database;
storing, in the information repository, a plurality of counts of instances for the plurality of search criteria in association with the respective source information and category information;
storing, for each of a plurality of unique source information and category information combinations, a count of instances for a first search criterion, the plurality of counts of instances for the plurality of search criteria including the count of instances for the first search criterion;
generating, for each of the plurality of unique source information and category information combinations, a ranked set of search criteria from the plurality of search criteria based on matching associated source information and category information; and
transmitting, from a server over a network, instructions to cause a client machine to generate a user interface that is configured to display the ranked set of search criteria.

* * * * *